US011313421B2

(12) United States Patent
Hirata et al.

(10) Patent No.: US 11,313,421 B2
(45) Date of Patent: Apr. 26, 2022

(54) VEHICLE DRIVE DEVICE

(71) Applicant: JTEKT CORPORATION, Osaka (JP)

(72) Inventors: Wataru Hirata, Ichinomiya (JP); Tetsuya Yamazaki, Tokai (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 17/069,908

(22) Filed: Oct. 14, 2020

(65) Prior Publication Data

US 2021/0123487 A1 Apr. 29, 2021

(30) Foreign Application Priority Data

Oct. 28, 2019 (JP) .............................. JP2019-195596

(51) Int. Cl.

| B60K 17/02 | (2006.01) |
|---|---|
| B60L 15/20 | (2006.01) |
| B60W 10/02 | (2006.01) |
| F16D 21/00 | (2006.01) |
| F16D 48/08 | (2006.01) |

(Continued)

(52) U.S. Cl.
CPC ................ *F16D 48/08* (2013.01); *B60K 1/00* (2013.01); *B60K 17/02* (2013.01); *B60L 15/2054* (2013.01); *B60W 10/02* (2013.01); *B60W 10/08* (2013.01); *B60W 30/188* (2013.01); *F16D 21/00* (2013.01); *B60K 17/348* (2013.01); *B60K 17/356* (2013.01); *B60K 2001/001* (2013.01); *B60W 2400/00* (2013.01); *B60W 2710/025* (2013.01); *B60W 2710/08* (2013.01); *F16D 13/52* (2013.01); *F16D 2500/1064* (2013.01);

(Continued)

(58) Field of Classification Search
CPC .......... F16D 48/08; F16D 21/00; F16D 13/52; F16D 2500/10412; F16D 2500/1064; F16D 2500/30406; F16D 2500/50251; B60K 1/00; B60K 17/02; B60K 17/348; B60K 17/356; B60K 2001/001; B60L 15/2054; B60W 10/02; B60W 10/08; B60W 30/188; B60W 2400/00; B60W 2710/025; B60W 2710/08

See application file for complete search history.

(56) References Cited

U.S. PATENT DOCUMENTS

| 8,423,230 B2 * | 4/2013 | Steinhauser | ............. B60K 6/48 |
|---|---|---|---|
| | | | 701/29.2 |
| 2003/0037977 A1 | 2/2003 | Tatara et al. | |
| 2018/0001886 A1 * | 1/2018 | Schmitt | ............... B60W 10/196 |

FOREIGN PATENT DOCUMENTS

| DE | 102018107745 A1 * | 10/2018 | ....... F16H 61/66272 |
|---|---|---|---|
| JP | 2003-063265 A | 3/2003 | |
| JP | 2005218221 A * | 8/2005 | ............... B60K 6/04 |

OTHER PUBLICATIONS

JP2005218221machine translation filed Nov. 3, 2021 (Year: 2021).*

* cited by examiner

*Primary Examiner* — Tisha D Lewis
(74) *Attorney, Agent, or Firm* — Oblon, McClelland, Maier & Neustadt, L.L.P.

(57) ABSTRACT

A vehicle drive device includes: an electric motor; a multi-plate clutch including a plurality of clutch plates; a pressing mechanism configured to press the multi-plate clutch; an output rotary member to which a drive force of the electric motor is transferred through the multi-plate clutch; and a control device configured to control the electric motor and the pressing mechanism. The control device is configured to control the pressing mechanism using information on the (Continued)

result of test operation performed while the vehicle is stationary.

4 Claims, 7 Drawing Sheets

(51) Int. Cl.
  *B60W 10/08*   (2006.01)
  *B60W 30/188*  (2012.01)
  *B60K 1/00*   (2006.01)
  B60K 17/356  (2006.01)
  B60K 17/348  (2006.01)
  F16D 13/52   (2006.01)

(52) U.S. Cl.
  CPC .............. *F16D 2500/10412* (2013.01); *F16D 2500/30406* (2013.01); *F16D 2500/50251* (2013.01)

VEHICLE DRIVE DEVICE

CROSS-REFERENCE TO RELATED APPLICATION

This application claims priority to Japanese Patent Application No. 2019-195596 filed on Oct. 28, 2019, incorporated herein by reference in its entirety.

BACKGROUND

1. Technical Field

The present disclosure relates to a vehicle drive device.

2. Description of Related Art

In some four-wheel-drive vehicles according to the related art in which front wheels and rear wheels can be driven, the front wheels are driven by an engine, and the rear wheels are driven by a drive force of an electric motor (see Japanese Unexamined Patent Application Publication No. 2003-63265 (JP 2003-63265 A), for example).

The four-wheel-drive vehicle described in JP 2003-63265 A includes a drive force distribution device that distributes a drive force of an electric motor to right and left rear wheels. The drive force distribution device includes: a first clutch interposed between the electric motor and the left rear wheel; a second clutch interposed between the electric motor and the right rear wheel; and clutch control means that controls the degree of engagement of the first and second clutches based on the ratio of distribution of a drive force to the right rear wheel and the left rear wheel which is determined based on a vehicle state such as the vehicle speed, the accelerator operation amount, the brake depression force, the steering angle of steering wheels, and the yaw rate. The first and second clutches are each a multi-plate clutch of a wet type in which frictional sliding between clutch plates is lubricated with lubricating oil.

SUMMARY

A drive force transferred through a multi-plate clutch is fluctuated in accordance with wear of clutch plates, variations in the surface texture of the clutch plates at the time of manufacture, etc. Therefore, an appropriate drive force corresponding to the vehicle state may not necessarily be transferred to the wheels. In recent years, in particular, a high precision has been required for a drive force to be transferred to each of the wheels compared to the related art, along with the advancement of electronic control for vehicles such as traction control for suppressing slipping of the wheels and stability control for suppressing side skidding during travel through a turn.

The present disclosure can provide a vehicle drive device that enables a drive force of an electric motor to be output to wheels with a high precision via a multi-plate clutch.

A first aspect of the present disclosure provides a vehicle drive device including: an electric motor; a multi-plate clutch including a plurality of clutch plates; a pressing mechanism configured to press the multi-plate clutch; an output rotary member to which a drive force of the electric motor is transferred through the multi-plate clutch; and a control device configured to control the electric motor and the pressing mechanism. The drive force is output from the output rotary member to wheels of a vehicle. The control device is configured to control the pressing mechanism using information on a result of test operation performed while the vehicle is stationary. The test operation includes gradually varying at least one of the drive force of the electric motor and a pressing force of the pressing mechanism to cause a state variation from a slipping state, in which slipping between the clutch plates occurs, to an engaged state, in which slipping between the clutch plates does not occur, or from the engaged state to the slipping state.

A second aspect of the present disclosure provides a vehicle drive device including: an electric motor; a drive force distribution device configured to distribute a drive force generated by the electric motor to right and left wheels of a vehicle; and a control device configured to control the electric motor and the drive force distribution device. The drive force distribution device has an input rotary member to which the drive force of the electric motor is input, a first output rotary member, a second output rotary member, a first multi-plate clutch including a plurality of clutch plates disposed between the input rotary member and the first output rotary member, a first pressing mechanism configured to press the first multi-plate clutch, a second multi-plate clutch including a plurality of clutch plates disposed between the input rotary member and the second output rotary member, and a second pressing mechanism configured to press the second multi-plate clutch. The control device is configured to control the first and second pressing mechanisms using information on a result of test operation performed while the vehicle is stationary. The test operation includes varying, with one of the first multi-plate clutch and the second multi-plate clutch disengaged, at least one of a pressing force that acts on another of the first multi-plate clutch and the second multi-plate clutch and the drive force of the electric motor to cause a state variation from a slipping state, in which slipping between the clutch plates of the other multi-plate clutch occurs, to an engaged state, in which slipping between the clutch plates does not occur, or from the engaged state to the slipping state.

With the configurations described above, a drive force of an electric motor can be output to wheels with a high precision via a multi-plate clutch.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

An embodiment of the present disclosure will be described with reference to FIGS. 1 to 7. The embodiment described below is provided as a suitable specific example for carrying out the present disclosure, and includes portions that specifically implement a variety of technical matters that are technically preferable. However, the technical scope of the present disclosure is not limited to such a specific aspect.

Configuration of Four-Wheel-Drive Vehicle

Figure 1:
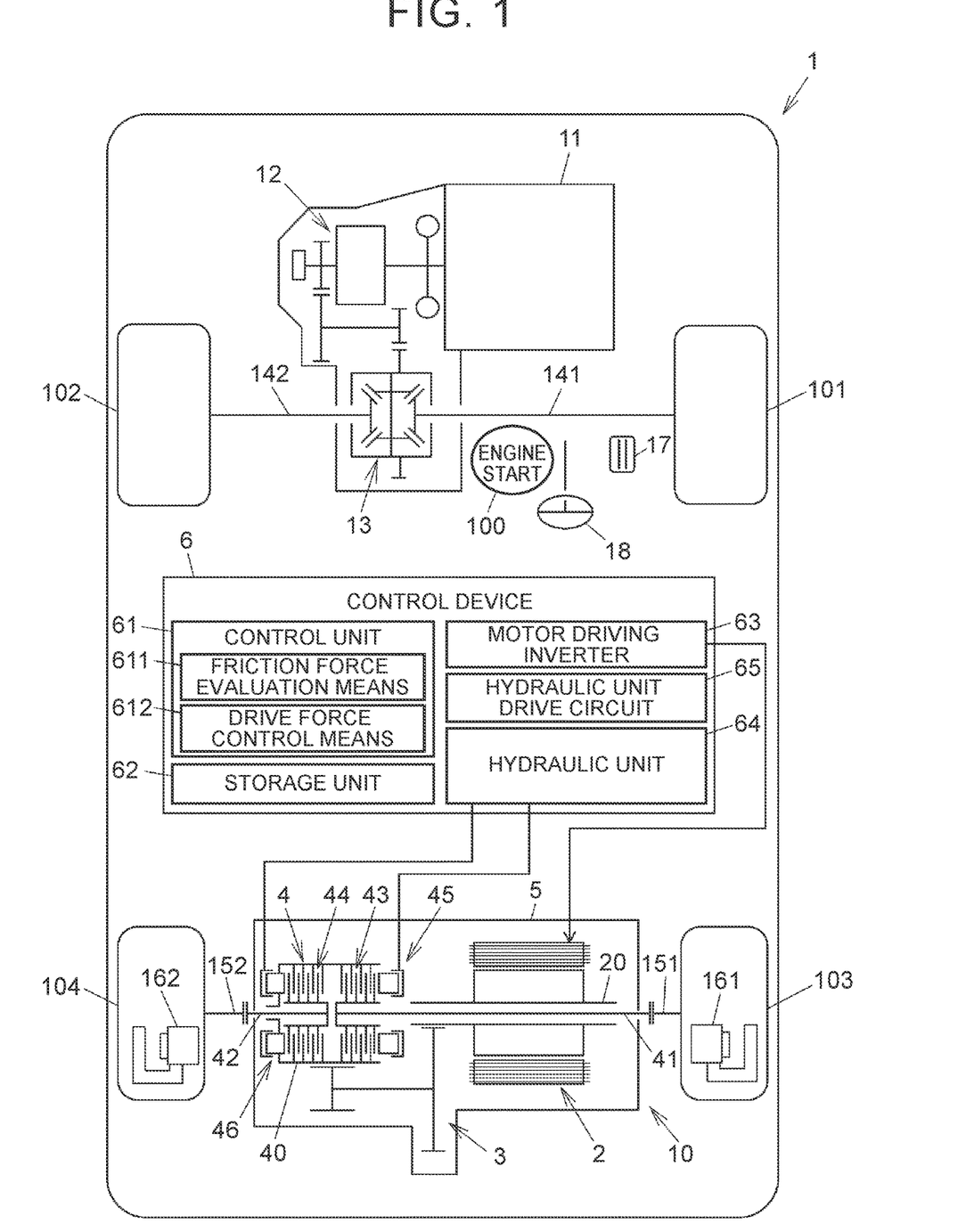
FIG. 1 is a schematic diagram illustrating an example of a schematic configuration of a four-wheel-drive vehicle on which a drive device is mounted according to an embodiment of the present disclosure.

FIG. 1 is a schematic diagram illustrating an example of a schematic configuration of a four-wheel-drive vehicle on which a drive device is mounted according to an embodiment of the present disclosure. A four-wheel-drive vehicle 1 includes a right front wheel 101 and a left front wheel 102 as main drive wheels driven by a drive force of an engine 11 as a main drive source, and a right rear wheel 103 and a left rear wheel 104 as auxiliary drive wheels driven by a drive device 10 that has an electric motor 2 as an auxiliary drive source. A wheel speed sensor is attached in correspondence with each of the right front wheel 101 and the left front wheel 102 and the right rear wheel 103 and the left rear wheel 104. A start switch 100 that is operable by a driver is attached at a driver's seat of the four-wheel-drive vehicle 1. When the driver turns the start switch 100 from an off state to an on state, the four-wheel-drive vehicle 1 is started to be brought into a state in which the four-wheel-drive vehicle 1 can travel.

The drive force of the engine 11 is transferred from a transmission 12 to a differential device 13, and distributed from the differential device 13 to the right front wheel 101 and the left front wheel 102 via right and left drive shafts 141 and 142, respectively. A drive force is transferred from the drive device 10 to the right rear wheel 103 and the left rear wheel 104 via right and left drive shafts 151 and 152, respectively. The main drive source may be a high-output electric motor, and may be of a so-called hybrid type in which an engine and a high-output electric motor are combined with each other.

The four-wheel-drive vehicle 1 also includes a parking brake 161 provided in correspondence with the right rear wheel 103, and a parking brake 162 provided in correspondence with the left rear wheel 104. The parking brakes 161 and 162 are actuated by an operation of the driver to inhibit forward and backward movement of the four-wheel-drive vehicle 1 while the vehicle is parked.

The drive device 10 includes: an electric motor 2 that generates a drive force for driving the right rear wheel 103 and the left rear wheel 104; a speed reduction mechanism 3 that reduces the speed of rotation transferred from an output shaft 20 of the electric motor 2; a drive force distribution device 4 that distributes and outputs a drive force input from the electric motor 2 via the speed reduction mechanism 3 to the right rear wheel 103 and the left rear wheel 104; a housing 5 fixed to the vehicle body; and a control device 6 that controls the electric motor 2 and the drive force distribution device 4.

Configuration of Drive Device

Figure 2:
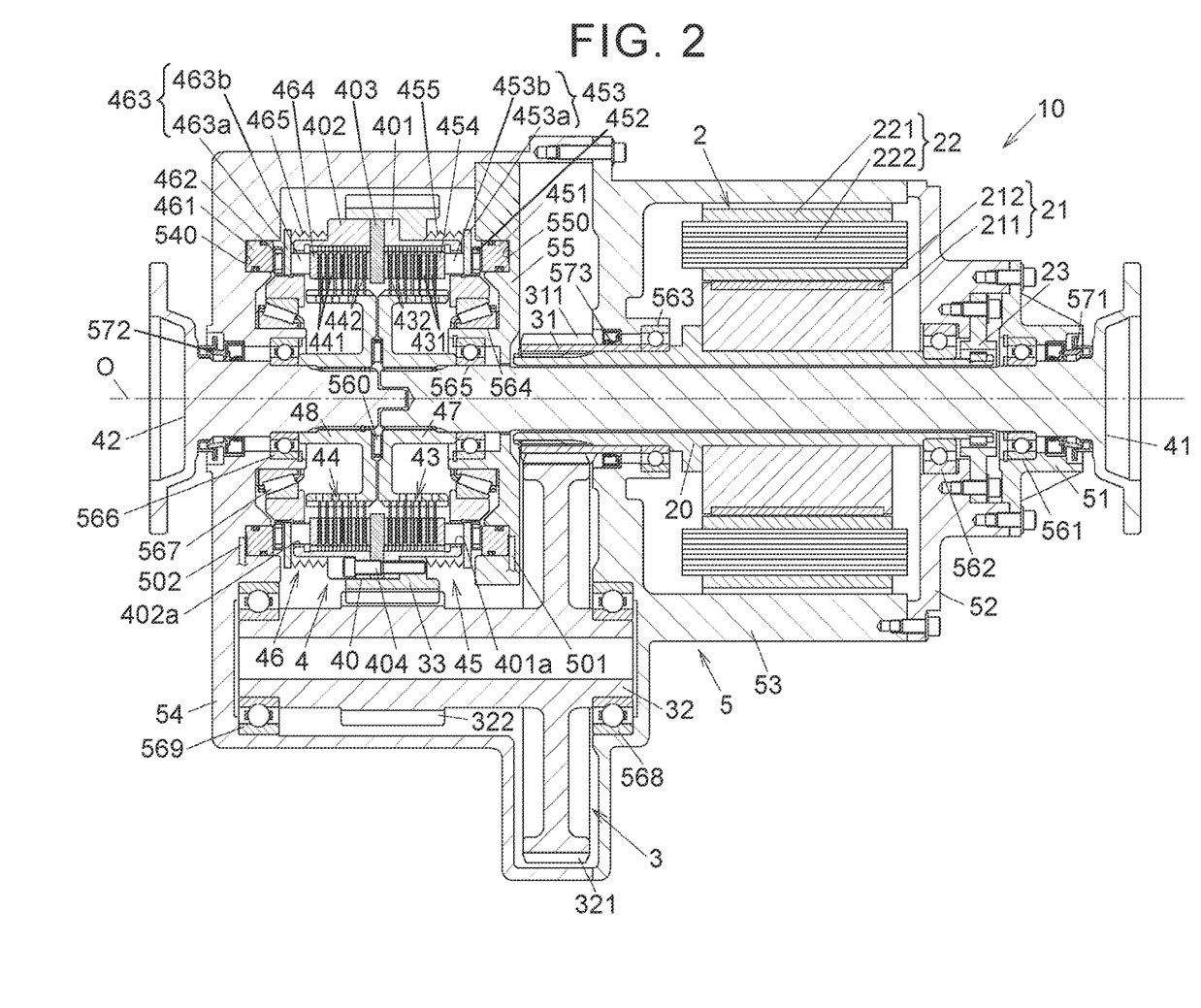
FIG. 2 is a sectional view illustrating an example of the configuration of the drive device.

FIG. 2 is a sectional view illustrating an example of the configuration of the inside of the housing 5 of the drive device 10. The left side of FIG. 2 corresponds to the left side of the four-wheel-drive vehicle 1. The right side of FIG. 2 corresponds to the right side of the four-wheel-drive vehicle 1. The housing 5 has first to fifth housing members 51 to 55. The housing members 51 to 55 are fixed to each other by a plurality of bolts. Rolling bearings 560 to 569 that smooth rotation of various portions and seal members 571 to 573 that suppress leakage of lubricating oil sealed in the housing 5 and entry of foreign matter are disposed at appropriate locations inside the housing 5.

The electric motor 2 has: an output shaft 20 having a hollow tube shape; a rotor 21 that rotates together with the output shaft 20; a stator 22 disposed at the outer periphery of the rotor 21; and a rotation sensor 23 that detects rotation of the output shaft 20. The rotor 21 has a rotor core 211 and a plurality of permanent magnets 212 fixed to the rotor core 211. The stator 22 has a stator core 221 and windings 222 for a plurality of phases wound around the stator core 221. Three-phase alternating current (AC) motor currents, for example, are supplied from the control device 6 to the windings 222 for the plurality of phases to rotate the rotor 21 with respect to the stator 22 with torque that matches the magnitude of the motor currents.

The speed reduction mechanism 3 is configured to have: a tubular pinion gear 31 externally fitted at an end portion of the output shaft 20 of the electric motor 2; a speed reduction gear 32 that has a large-diameter gear portion 321 and a small-diameter gear portion 322; and a ring gear 33 meshed with the small-diameter gear portion 322. The pinion gear 31 is spline-fitted with the output shaft 20 to rotate together with the output shaft 20. A gear portion 311 provided at the outer periphery of the pinion gear 31 is meshed with the large-diameter gear portion 321 of the speed reduction gear 32.

The drive force distribution device 4 includes: an input rotary member 40 to which a drive force of the electric motor 2 is input from the speed reduction mechanism 3; first and second output rotary members 41 and 42 provided coaxially with the input rotary member 40 so as to be relatively rotatable; a first multi-plate clutch 43 composed of a plurality of clutch plates disposed between the input rotary member 40 and the first output rotary member 41; a second multi-plate clutch 44 composed of a plurality of clutch plates disposed between the input rotary member 40 and the second output rotary member 42; a first pressing mechanism 45 that presses the first multi-plate clutch 43; and a second pressing mechanism 46 that presses the second multi-plate clutch 44.

In the present embodiment, in addition, a first clutch hub 47 is interposed between the first multi-plate clutch 43 and the first output rotary member 41, and a second clutch hub 48 is interposed between the second multi-plate clutch 44 and the second output rotary member 42. The first output rotary member 41 is spline-fitted with the first clutch hub 47 to rotate together with the first clutch hub 47. The second output rotary member 42 is spline-fitted with the second clutch hub 48 to rotate together with the second clutch hub 48.

The input rotary member 40, the first output rotary member 41, and the second output rotary member 42 are relatively rotatable with respect to each other about a rotational axis O that extends along the vehicle right-left direction. The first multi-plate clutch 43 and the second multi-plate clutch 44 are each a multi-plate clutch of a wet type in which frictional sliding between clutch plates to be discussed later is lubricated with lubricating oil sealed in the housing 5. Hereinafter, the direction which is parallel to the rotational axis O will be referred to as an "axial direction".

The input rotary member 40 has: a first clutch drum 401 disposed at the outer periphery of the first clutch hub 47; a second clutch drum 402 disposed at the outer periphery of the second clutch hub 48; a center plate 403 disposed between the first clutch drum 401 and the second clutch drum 402; and a plurality of bolts 404. The bolts 404 couple the first clutch drum 401, the second clutch drum 402, and the center plate 403 so as not to be relatively rotatable, and fixes these components to the ring gear 33. One of the bolts 404 is illustrated in FIG. 2.

The first multi-plate clutch 43 is composed of a plurality of first input clutch plates 431 that rotates together with the first clutch drum 401 and a plurality of first output clutch plates 432 that rotates together with the first clutch hub 47. The first input clutch plates 431 and the first output clutch plates 432 are disposed alternately along the axial direction. The first input clutch plates 431 are movable in the axial direction and relatively non-rotatable with respect to the first clutch drum 401 through spline engagement with the first clutch drum 401. The first output clutch plates 432 are movable in the axial direction and relatively non-rotatable with respect to the first clutch hub 47 through spline engagement with the first clutch hub 47.

The second multi-plate clutch 44 is composed of a plurality of second input clutch plates 441 that rotates together with the second clutch drum 402 and a plurality of second output clutch plates 442 that rotates together with the second clutch hub 48. The second input clutch plates 441 and the second output clutch plates 442 are disposed alternately along the axial direction. The second input clutch plates 441 are movable in the axial direction and relatively non-rotatable with respect to the second clutch drum 402 through spline engagement with the second clutch drum 402. The second output clutch plates 442 are movable in the axial direction and relatively non-rotatable with respect to the second clutch hub 48 through spline engagement with the second clutch hub 48.

The first pressing mechanism 45 has: a ring-shaped piston 451 that receives a hydraulic pressure supplied from a hydraulic unit 64; a thrust roller bearing 452 disposed next to the piston 451 in the axial direction; a pressing member 453 that receives a pressing force of the piston 451 via the thrust roller bearing 452; a pressing plate 454 disposed on the inner side of the first clutch drum 401; and a return spring 455 that abuts against the pressing member 453.

A part of the piston 451 in the axial direction is housed in a first hydraulic chamber 550 having an annular shape in the fifth housing member 55. The piston 451 presses the first multi-plate clutch 43 using the pressure of working oil supplied from the hydraulic unit 64 by way of a first oil path 501. The pressing member 453 integrally has an annular portion 453a having a circular ring shape and a plurality of columnar pressing projections 453b that projects in the axial direction from the annular portion 453a toward the first multi-plate clutch 43. The pressing projections 453b are inserted through respective through holes 401a provided in the first clutch drum 401. The distal end portions of the pressing projections 453b abut against the pressing plate 454. The return spring 455 abuts against the annular portion 453a to bias the pressing member 453 toward the fifth housing member 55.

The second pressing mechanism 46 has: a ring-shaped piston 461 that receives a hydraulic pressure supplied from the hydraulic unit 64; a thrust roller bearing 462 disposed next to the piston 461 in the axial direction; a pressing member 463 that receives a pressing force of the piston 461 via the thrust roller bearing 462; a pressing plate 464 disposed on the inner side of the second clutch drum 402; and a return spring 465 that abuts against the pressing member 463.

A part of the piston 461 in the axial direction is housed in a second hydraulic chamber 540 having an annular shape in the fourth housing member 54. The piston 461 presses the second multi-plate clutch 44 using the pressure of working oil supplied from the hydraulic unit 64 by way of a second oil path 502. The pressing member 463 integrally has an annular portion 463a and a plurality of columnar pressing projections 463b. The pressing projections 463b are inserted through respective through holes 402a provided in the second clutch drum 402 to abut against the pressing plate 464. The return spring 465 abuts against the annular portion 463a to bias the pressing member 463 toward the fourth housing member 54.

The first multi-plate clutch 43 transfers a drive force from the first clutch drum 401 to the first clutch hub 47 using a friction force between the first input clutch plates 431 and the first output clutch plates 432. The drive force which is transferred through the first multi-plate clutch 43 is larger as a pressing force (thrust force in the axial direction) generated by the first pressing mechanism 45 is larger. The second multi-plate clutch 44 transfers a drive force (thrust force in the axial direction) from the second clutch drum 402 to the second clutch hub 48 using a friction force between the second input clutch plates 441 and the second output clutch plates 442. The drive force which is transferred through the second multi-plate clutch 44 is larger as a pressing force generated by the second pressing mechanism 46 is larger.

As illustrated in FIG. 1, the control device 6 has: a control unit 61 that has a central processing unit (CPU); a storage unit 62 that includes a non-volatile memory; a motor driving inverter 63 that generates a motor current to be supplied to the electric motor 2; a hydraulic unit 64 that supplies working oil to the first hydraulic chamber 550 and the second hydraulic chamber 540; and a hydraulic unit drive circuit 65 that drives the hydraulic unit 64. That is, the control device 6 is an electronic control unit (ECU).

With the CPU executing a program stored in the storage unit 62, the control unit 61 functions as: friction force evaluation means 611 that evaluates a friction force generated by the first and second multi-plate clutches 43 and 44; and drive force control means 612 that controls a drive force to be output to the right rear wheel 103 and the left rear wheel 104 based on the result of an evaluation made by the friction force evaluation means 611.

The motor driving inverter 63 has switching elements such as transistors, and generates a motor current by switching the voltage of a direct current (DC) power source such as a battery through pulse width modulation (PWM) control by the control unit 61. The control unit 61, as the drive force control means 612, can control the electric motor 2 by varying the duty ratio of a PWM signal output to the motor driving inverter 63.

Figure 3:
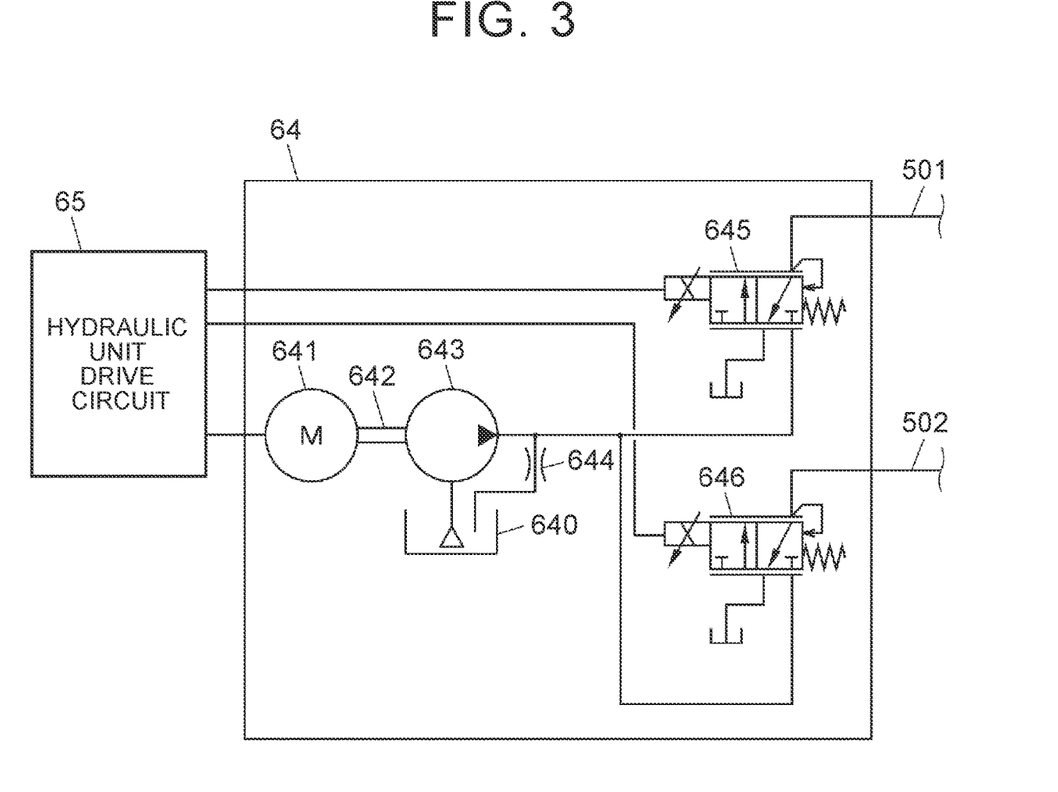
FIG. 3 is a circuit diagram illustrating an example of the configuration of a hydraulic unit.

FIG. 3 is a circuit diagram illustrating an example of the configuration of the hydraulic unit 64. The hydraulic unit 64 has a pump motor 641 that generates torque that matches a current supplied from the hydraulic unit drive circuit 65, a hydraulic pump 643 coupled to the pump motor 641 by a coupling shaft 642, a relief valve 644, and first and second control valves 645 and 646. The hydraulic pump 643 is driven by the pump motor 641, and draws up working oil from a reservoir 640 to discharge the working oil. The relief valve 644 is a fixed throttle valve that recirculates a part of the discharged working oil back to the reservoir 640.

The first and second control valves 645 and 646 are each a pressure control valve that regulates the pressure of working oil supplied to each of the first and second hydraulic chambers 550 and 540. The valve opening degree of the first and second control valves 645 and 646 is varied in accordance with a control current supplied from the hydraulic unit drive circuit 65. The hydraulic unit drive circuit 65 supplies a motor current with a magnitude that matches a command signal from the control unit 61 and a control current to the pump motor 641 and the first and second control valves 645 and 646.

The first control valve 645 has a supply port to which working oil is supplied from the hydraulic pump 643, and an output port from which working oil is output to the first oil path 501. The first pressing mechanism 45 presses the first multi-plate clutch 43 toward the center plate 403 with a pressing force that matches the pressure of working oil supplied from the first oil path 501 to the first hydraulic chamber 550. The second control valve 646 has a supply port to which working oil is supplied from the hydraulic pump 643, and an output port from which working oil is output to the second oil path 502. The second pressing mechanism 46 presses the second multi-plate clutch 44 toward the center plate 403 with a pressing force that matches the pressure of working oil supplied from the second oil path 502 to the second hydraulic chamber 540.

The control unit 61, as the drive force control means 612, can regulate a pressing force that acts on the first multi-plate clutch 43 and a pressing force that acts on the second multi-plate clutch 44 by controlling the first pressing mechanism 45 and the second pressing mechanism 46 by increasing and decreasing currents to be supplied to the pump motor 641, the first control valve 645, and the second control valve 646.

The control unit 61 can acquire various kinds of vehicle information through an in-vehicle communication network such as a controller area network (CAN), for example. The vehicle information includes information such as the wheel speeds of the right and left front wheels 101 and 102 and the right and left rear wheels 103 and 104, the depression amount of an accelerator pedal 17, and the steering angle of a steering wheel 18. The control unit 61 can also acquire information on the on/off state of the start switch 100 and the actuation state of the parking brakes 161 and 162.

The storage unit 62 stores information on a plurality of control maps that indicates the relationship between the vehicle information and the magnitude of the drive force to be output to the right and left rear wheels 103 and 104. Examples of the control maps include: a front/rear wheel speed difference-sensitive map that indicates characteristics in which the drive force to be output to the right and left rear wheels 103 and 104 is larger as the difference between the average wheel speed of the right and left front wheels 101 and 102 and the average wheel speed of the right and left rear wheels 103 and 104 is larger; an acceleration operation amount-sensitive map that indicates characteristics in which the drive force to be output to the right and left rear wheels 103 and 104 is larger as the depression amount of the accelerator pedal 17 is larger; and a steering angle-sensitive map that indicates characteristics in which the drive force to be output to one of the right and left rear wheels 103 and 104 on the outer side of a turn is larger as the steering angle is larger and the vehicle speed is higher.

The drive force control means 612 calculates, based on such control maps, the drive force to be output from the first output rotary member 41 to the right rear wheel 103 as first command output torque and the drive force to be output from the second output rotary member 42 to the left rear wheel 104 as second command output torque. The control device 6 controls the electric motor 2, the first pressing mechanism 45, and the second pressing mechanism 46 such that a drive force that matches the first command output torque is output from the first output rotary member 41 and a drive force that matches the second command output torque is output from the second output rotary member 42.

The drive force which is transferred through the first multi-plate clutch 43 is fluctuated in accordance with wear of the first input clutch plates 431 and the first output clutch plates 432, variations in the surface texture of the clutch plates at the time of manufacture, etc., even when the pressing force of the first pressing mechanism 45 is constant. Likewise, the drive force which is transferred through the second multi-plate clutch 44 is fluctuated in accordance with wear of the second input clutch plates 441 and the second output clutch plates 442, variations in the surface texture of the clutch plates at the time of manufacture, etc., even when the pressing force of the second pressing mechanism 46 is constant.

Therefore, the control unit 61, as the friction force evaluation means 611, performs test operation while the vehicle is stationary, and thereafter, as the drive force control means 612, controls the first and second pressing mechanisms 45 and 46 using information on the result of the test operation. The test operation includes varying, with one of the first and second multi-plate clutches 43 and 44 disengaged, at least one of the pressing force which acts on the other multi-plate clutch and the drive force of the electric motor 2 to cause a state variation from a slipping state, in which slipping between the clutch plates of the other multi-plate clutch occurs, to an engaged state, in which slipping between the clutch plates does not occur, or from the engaged state to the slipping state. The control unit 61, as the drive force control means 612, performs control so as to press the clutch plates more strongly as slipping between the clutch plates is more likely to occur based on an index value that indicates the likelihood of occurrence of slipping between the clutch plates and that is obtained as the information on the result of the test operation. Four specific examples of the test operation will be described below with reference to FIGS. 4 to 7.

Figure 4:
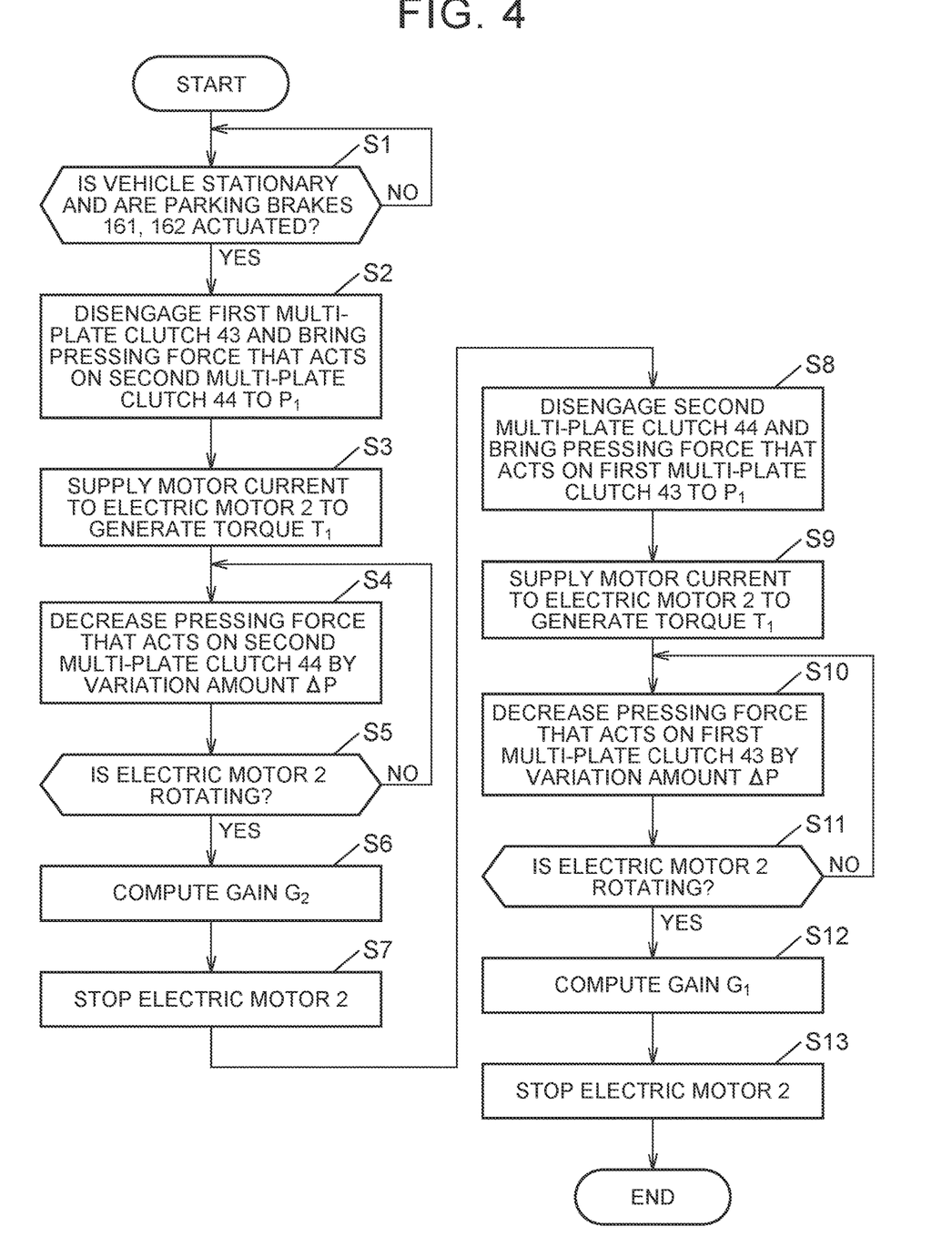
FIG. 4 is a flowchart illustrating an example of the procedures of processes executed by a control device.

FIG. 4 is a flowchart illustrating an example of the procedures of processes of the test operation for a case where a state, with one of the first and second multi-plate clutches 43 and 44 disengaged, variation from the engaged state to the slipping state is caused by gradually reducing the pressing force which acts on the other multi-plate clutch. The control unit 61, as the drive force control means 612, executes the processes illustrated in the flowchart after the start switch 100 is brought from the on state to the off state. Power is supplied to the control device 6 at least during execution of the test operation, even after the start switch 100 is turned off.

In the processes illustrated in the flowchart, the control unit 61 first determines whether the four-wheel-drive vehicle 1 is stationary and the parking brakes 161 and 162 are actuated (step S1). In the case where the result of the determination is positive (Yes), the control unit 61 disengages the first multi-plate clutch 43, and brings the pressing force which acts on the second multi-plate clutch 44 to a predetermined pressing force $P_1$ (step S2). Specifically, the control current to be supplied to the first control valve 645 of the hydraulic unit 64 is brought to zero, and the motor current to be supplied to the pump motor 641 of the hydraulic unit 64 and the control current to be supplied to the second control valve 646 are adjusted such that the pressing force which is generated by the second pressing mechanism 46 is brought to the predetermined pressing force $P_1$.

Next, the control unit 61 supplies a motor current to the electric motor 2 to cause the electric motor 2 to generate predetermined torque $T_1$ (step S3). With the predetermined torque $T_1$, the electric motor 2 is not rotated with the second multi-plate clutch 44 pressed with the predetermined pressing force $P_1$ and the parking brake 162 actuated. The torque $T_1$ is a value that is about one-tenth of the rated torque of the electric motor 2. The drive force (drive force transfer capacity) that can be transferred with the first multi-plate clutch 43 pressed with the pressing force $P_1$ is 1.2 times, for example, of a value obtained by multiplying the torque $T_1$ by the speed reduction ratio of the speed reduction mechanism 3.

Next, through the processes in steps S4 and S5, the control unit 61 gradually reduces the pressing force which acts on the second multi-plate clutch 44 from the predetermined pressing force $P_1$ until the second multi-plate clutch 44 is brought into the slipping state with slipping occurring between the second input clutch plates 441 and the second output clutch plates 442 of the second multi-plate clutch 44. Specifically, the pressing force which acts on the second multi-plate clutch 44 is reduced by a predetermined variation amount $\Delta P$ which is sufficiently smaller than the predetermined pressing force $P_1$ (step S4). When the electric motor 2 is not rotating (step S5: No), the process in step S4 is repeatedly executed. It is possible to determine whether the electric motor 2 is rotating in accordance with a value detected by the rotation sensor 23.

When the electric motor 2 is rotating (step S5: Yes) in the determination process in step S5, on the other hand, a gain $G_2$ is computed based on the pressing force which acts on the second multi-plate clutch 44 at that time (step S6). The second command output torque is multiplied by the gain $G_2$ when controlling the second pressing mechanism 46 thereafter. That is, when controlling the second pressing mechanism 46 with the start switch 100 turned on again, the second pressing mechanism 46 is controlled such that a drive force with a value obtained by multiplying the second command output torque which is calculated based on the control map by the gain $G_2$ which is computed in step S6 is transferred to the second output rotary member 42 through the second multi-plate clutch 44. After computing the gain $G_2$, the control unit 61 stops the electric motor 2 (step S7).

The pressing force ($P_1 - \Delta P \times N$ in the case where the number of times of execution of the process in step S4 is N) which acts on the second multi-plate clutch 44 when it is determined in the determination process in step S5 that the electric motor 2 is rotating is an index value that indicates the likelihood of occurrence of slipping between the second input clutch plates 441 and the second output clutch plates 442 of the second multi-plate clutch 44. The second multi-plate clutch 44 is more likely to slip as the index value is larger. The gain $G_2$ which is computed in step S6 is stored in a non-volatile memory of the storage unit 62 so as to be read when the start switch 100 is turned on again.

The gain $G_2$ has a value of 1 in the case where there is little friction between the second input clutch plates 441 and the second output clutch plates 442 of the second multi-plate clutch 44 and the relationship between the pressing force which acts on the second multi-plate clutch 44 and the transferred drive force is as designed, and has a value of more than 1 in the case where slipping between the second input clutch plates 441 and the second output clutch plates 442 is more likely to occur than designed, or in other words in the case where the electric motor 2 rotates with a stronger pressing force than that for a case where the second multi-plate clutch 44 which is characterized as designed is used. Consequently, the second multi-plate clutch 44 is pressed by the second pressing mechanism 46 more strongly as slipping between the second input clutch plates 441 and the second output clutch plates 442 is more likely to occur.

Next, the control unit 61 disengages the second multi-plate clutch 44, and executes processes that are similar to the processes in steps S2 to S7 described above for the first multi-plate clutch 43. That is, the control unit 61 disengages the second multi-plate clutch 44 and brings the pressing force which acts on the first multi-plate clutch 43 to the predetermined pressing force $P_1$ (step S8), causes the electric motor 2 to generate the predetermined torque $T_1$ (step S9), and gradually reduces the pressing force which acts on the first multi-plate clutch 43 from the predetermined pressing force $P_1$ until slipping occurs between the first input clutch plates 431 and the first output clutch plates 432 of the first multi-plate clutch 43 (steps S10 and S11).

Then, a gain $G_1$ is computed based on the pressing force at the time when slipping occurs in the first multi-plate clutch 43 (step S12). The first command output torque is multiplied by the gain $G_1$ when controlling the first pressing mechanism 45 thereafter. The electric motor 2 is stopped (step S13). The gain $G_1$ has a value of 1 in the case where there is little friction between the first input clutch plates 431 and the first output clutch plates 432 of the first multi-plate clutch 43 and the relationship between the pressing force which acts on the first multi-plate clutch 43 and the transferred drive force is as designed, and has a value of more than 1 in the case where slipping between the first input clutch plates 431 and the first output clutch plates 432 is more likely to occur than designed. Consequently, the first multi-plate clutch 43 is pressed by the first pressing mechanism 45 more strongly as slipping between the first input clutch plates 431 and the first output clutch plates 432 is more likely to occur.

Figure 5:
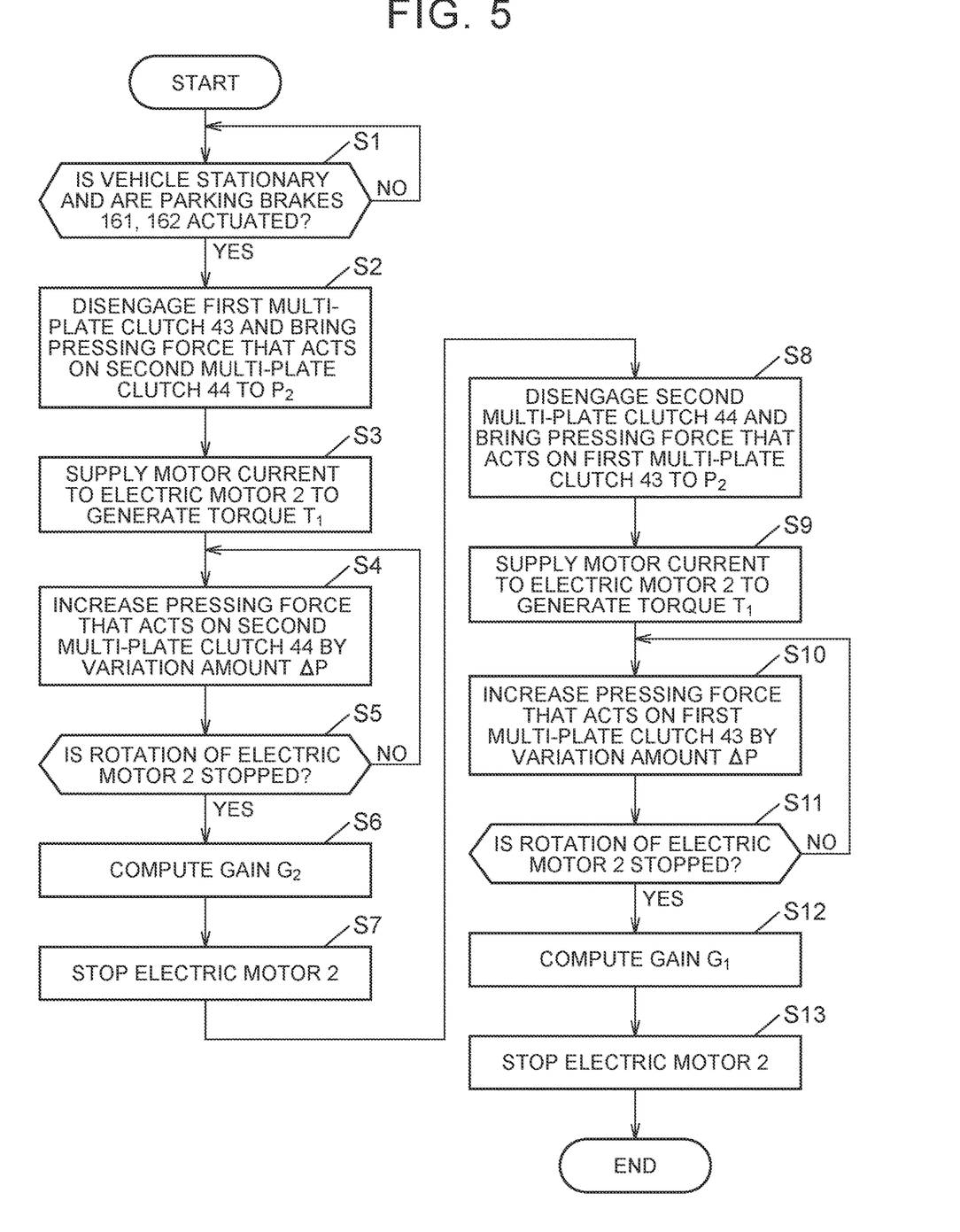
FIG. 5 is a flowchart illustrating a different example of the procedures of processes executed by the control device.

FIG. 5 is a flowchart illustrating an example of the procedures of processes of the test operation for a case where, with one of the first and second multi-plate clutches 43 and 44 disengaged, a state variation from the slipping state to the engaged state is caused by gradually increasing the pressing force which acts on the other multi-plate clutch. The flowchart illustrated in FIG. 5 is the same as the flowchart illustrated in FIG. 4 except for the content of the processes in steps S2, S4, S5, S8, S10, and S11. Thus, the processes in such steps will be described in detail, and redundant description of the processes in the common steps will be omitted.

In the flowchart illustrated in FIG. 5, the control unit 61 disengages the first multi-plate clutch 43 and brings the pressing force which acts on the second multi-plate clutch 44 to a predetermined pressing force $P_2$ in the process in step S2. With the pressing force $P_2$, slipping between the second input clutch plates 441 and the second output clutch plates 442 of the second multi-plate clutch 44 occurs when the electric motor 2 is caused to generate the predetermined torque $T_1$ in step S3.

In the process in step S4, the pressing force which acts on the second multi-plate clutch 44 is increased by the predetermined variation amount $\Delta P$. When rotation of the electric motor 2 is not stopped (step S5: No), the process in step S4 is repeatedly executed. When rotation of the electric motor 2 is stopped (step S5: Yes) in the determination process in step S5, on the other hand, the gain $G_2$ is computed based on the pressing force which acts on the second multi-plate clutch 44 at that time (step S6).

In addition, the gain $G_1$ is computed by performing similar processes for the first multi-plate clutch 43 in steps S8 to S12. The pressing force which acts on the second multi-plate clutch 44 when it is determined in the determination process in step S5 that rotation of the electric motor 2 is stopped is an index value that indicates the likelihood of occurrence of slipping between the second input clutch plates 441 and the second output clutch plates 442 of the second multi-plate clutch 44. The pressing force which acts on the first multi-plate clutch 43 when it is determined in the determination process in step S11 that rotation of the electric motor 2 is stopped is an index value that indicates the likelihood of occurrence of slipping between the first input clutch plates 431 and the first output clutch plates 432 of the first multi-plate clutch 43.

Also with the processes in the flowchart illustrated in FIG. 5, the first multi-plate clutch 43 is pressed by the first pressing mechanism 45 more strongly as slipping between the first input clutch plates 431 and the first output clutch plates 432 is more likely to occur, and the second multi-plate clutch 44 is pressed by the second pressing mechanism 46 more strongly as slipping between the second input clutch plates 441 and the second output clutch plates 442 is more likely to occur.

Figure 6:
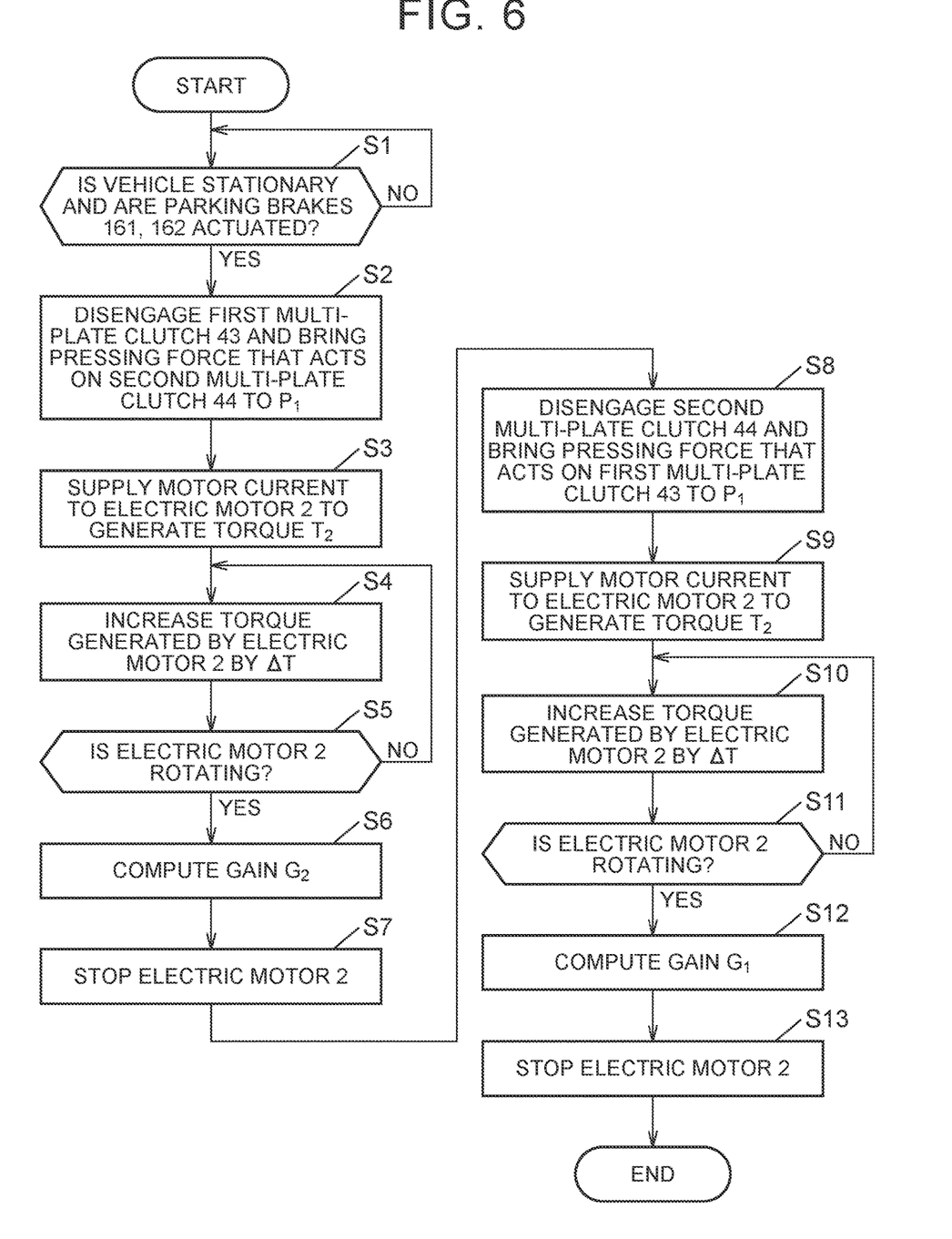
FIG. 6 is a flowchart illustrating a different example of the procedures of processes executed by the control device.

FIG. 6 is a flowchart illustrating an example of the procedures of processes of the test operation for a case where, with one of the first and second multi-plate clutches 43 and 44 disengaged, a state variation of the other multi-plate clutch from the engaged state to the slipping state is caused by increasing the drive force of the electric motor 2. The flowchart illustrated in FIG. 6 is the same as the flowchart illustrated in FIG. 4 except for the content of the processes in steps S3, S4, S9, and S10. Thus, the processes in such steps will be described in detail, and redundant description of the processes in the common steps will be omitted.

In the flowchart illustrated in FIG. 6, the control unit 61 causes the electric motor 2 to generate predetermined torque $T_2$ (step S3). With the predetermined torque $T_2$, the electric motor 2 is not rotated with the second multi-plate clutch 44 pressed with the predetermined pressing force $P_1$ and the parking brake 162 actuated.

In the process in step S4, torque generated by the electric motor 2 is increased by ΔT. When the electric motor 2 is not rotating (step S5: No), the process in step S4 is repeatedly executed. When the electric motor 2 is rotating (step S5: Yes) in the determination process in step S5, on the other hand, the gain $G_2$ is computed based on the torque generated by the electric motor 2 at that time (step S6).

In addition, the gain $G_1$ is computed by performing similar processes for the first multi-plate clutch 43 in steps S8 to S12. The torque of the electric motor 2 at the time when it is determined in the determination process in step S5 that the electric motor 2 is rotating is an index value that indicates the likelihood of occurrence of slipping between the second input clutch plates 441 and the second output clutch plates 442 of the second multi-plate clutch 44. The torque of the electric motor 2 at the time when it is determined in the determination process in step S11 that the electric motor 2 is rotating is an index value that indicates the likelihood of occurrence of slipping between the first input clutch plates 431 and the first output clutch plates 432 of the first multi-plate clutch 43.

Also with the processes in the flowchart illustrated in FIG. 6, the first multi-plate clutch 43 is pressed by the first pressing mechanism 45 more strongly as slipping between the first input clutch plates 431 and the first output clutch plates 432 is more likely to occur, and the second multi-plate clutch 44 is pressed by the second pressing mechanism 46 more strongly as slipping between the second input clutch plates 441 and the second output clutch plates 442 is more likely to occur.

Figure 7:
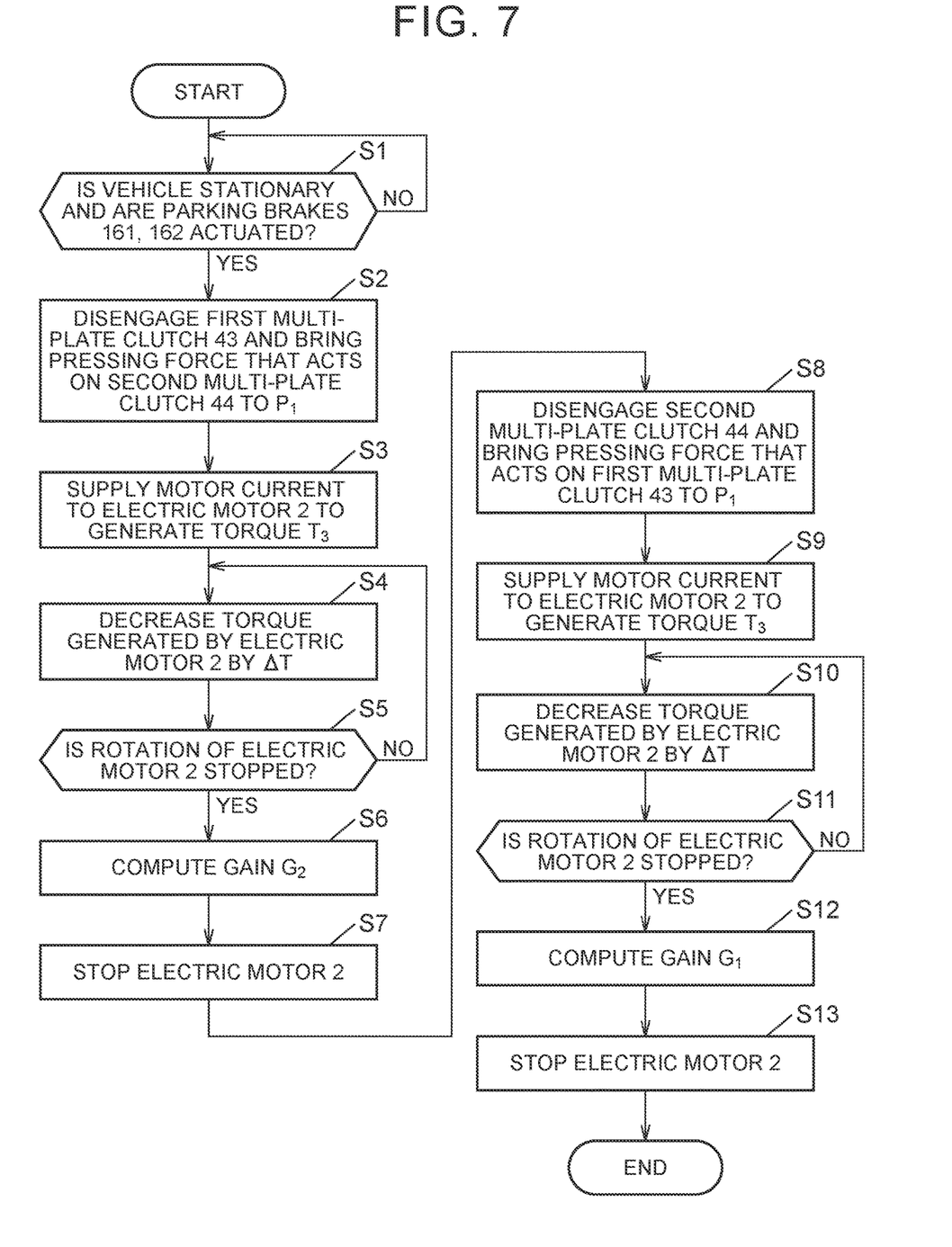
FIG. 7 is a flowchart illustrating a different example of the procedures of processes executed by the control device.

FIG. 7 is a flowchart illustrating an example of the procedures of processes of the test operation for a case where, with one of the first and second multi-plate clutches 43 and 44 disengaged, a state variation of the other multi-plate clutch from the slipping state to the engaged state is caused by decreasing the drive force of the electric motor 2. The flowchart illustrated in FIG. 7 is the same as the flowchart illustrated in FIG. 4 except for the content of the processes in steps S3, S4, S9, and S10. Thus, the processes in such steps will be described in detail, and redundant description of the processes in the common steps will be omitted.

In the flowchart illustrated in FIG. 7, the control unit 61 causes the electric motor 2 to generate predetermined torque $T_3$ (step S3). With the predetermined torque $T_3$, slipping between the second input clutch plates 441 and the second output clutch plates 442 occurs even when the second multi-plate clutch 44 is pressed with the predetermined pressing force $P_1$.

In the process in step S4, torque generated by the electric motor 2 is decreased by ΔT. When rotation of the electric motor 2 is not stopped (step S5: No), the process in step S4 is repeatedly executed. When rotation of the electric motor 2 is stopped (step S5: Yes) in the determination process in step S5, on the other hand, the gain $G_2$ is computed based on the torque generated by the electric motor 2 at that time (step S6).

In addition, the gain $G_1$ is computed by performing similar processes for the first multi-plate clutch 43 in steps S8 to S12. The torque of the electric motor 2 at the time when it is determined in the determination process in step S5 that rotation of the electric motor 2 is stopped is an index value that indicates the likelihood of occurrence of slipping between the second input clutch plates 441 and the second output clutch plates 442 of the second multi-plate clutch 44. The torque of the electric motor 2 at the time when it is determined in the determination process in step S11 that rotation of the electric motor 2 is stopped is an index value that indicates the likelihood of occurrence of slipping between the first input clutch plates 431 and the first output clutch plates 432 of the first multi-plate clutch 43.

Also with the processes in the flowchart illustrated in FIG. 7, the first multi-plate clutch 43 is pressed by the first pressing mechanism 45 more strongly as slipping between the first input clutch plates 431 and the first output clutch plates 432 is more likely to occur, and the second multi-plate clutch 44 is pressed by the second pressing mechanism 46 more strongly as slipping between the second input clutch plates 441 and the second output clutch plates 442 is more likely to occur.

Effect of Embodiment

With the drive device 10 according to the embodiment described above, the first and second pressing mechanisms 45 and 46 are controlled using information on the result of test operation, and thus the drive force of the electric motor 2 can be output with a high precision via the first and second multi-plate clutches 43 and 44.

Modification of Embodiment

The embodiment described above can be modified as appropriate. For example, while test operation is performed after the start switch 100 of the four-wheel-drive vehicle 1 is turned off in the embodiment described above, the present disclosure is not limited thereto. For example, test operation may be performed in a factory after assembly of the four-wheel-drive vehicle 1. In this case, it is possible to suppress an error caused in a drive force transferred through the first and second multi-plate clutches 43 and 44 due to variations in the surface texture of the first and second input clutch plates 431 and 441 and the first and second output clutch plates 432 and 442 at the time of manufacture, etc., for example.

In addition, while the gains $G_1$ and $G_2$ are computed based on the result of test operation and the first and second pressing mechanisms 45 and 46 are controlled such that drive forces with values obtained by multiplying the first and second command output torques which are calculated based on a control map by the gains $G_1$ and $G_2$, respectively, are transferred to the first and second output rotary members 41 and 42 through the first and second multi-plate clutches 43 and 44 in the embodiment described above, the present disclosure is not limited thereto. A correction value to be added to or subtracted from the first and second command output torques may be calculated based on the result of test operation, and the first and second pressing mechanisms 45 and 46 may be controlled such that drive forces with values obtained by adding or subtracting the correction value to or from the first and second command output torques are transferred to the first and second output rotary members 41 and 42 through the first and second multi-plate clutches 43 and 44. Furthermore, the control map may be altered based on the result of test operation.

In addition, while the drive force of the electric motor 2 is distributed and output to the right rear wheel 103 and the left rear wheel 104 in the embodiment described above, the present disclosure is not limited thereto. For example, the drive device may be configured such that the drive force of the electric motor is transferred to the differential device via a single multi-plate clutch and the drive force is distributed and output to the right rear wheel 103 and the left rear wheel 104 through the differential device. In this case, it is possible to synchronize rotation of the electric motor and rotation of the right rear wheel 103 and the left rear wheel 104 smoothly and precisely through the single multi-plate clutch, for example, by performing test operation for the multi-plate clutch in the same manner as described above.

While the present disclosure has been described above based on the embodiment, such an embodiment does not limit the disclosure according to the claims.

What is claimed is:

1. A vehicle drive device comprising:
    an electric motor;
    a drive force distribution device configured to distribute a drive force generated by the electric motor to right and left wheels of a vehicle; and
    processing circuitry configured to control the electric motor and the drive force distribution device, wherein:
    the drive force distribution device includes an input rotary member to which the drive force of the electric motor is input, a first output rotary member, a second output rotary member, a first multi-plate clutch including a plurality of clutch plates disposed between the input rotary member and the first output rotary member, a first pressing mechanism including a first piston configured to press the first multi-plate clutch, a second multi-plate clutch including a plurality of clutch plates disposed between the input rotary member and the second output rotary member, and a second pressing mechanism including a second piston configured to press the second multi-plate clutch;
    the processing circuitry is configured to control the first and second pressing mechanisms using information on a result of test operation performed while the vehicle is stationary; and
    the test operation includes varying, with one of the first multi-plate clutch and the second multi-plate clutch disengaged, at least one of a pressing force that acts on another of the first multi-plate clutch and the second multi-plate clutch and the drive force of the electric motor to cause a state variation from a slipping state, in which slipping between the clutch plates of the other multi-plate clutch occurs, to an engaged state, in which slipping between the clutch plates does not occur, or from the engaged state to the slipping state.

2. The vehicle drive device according to claim 1, wherein the processing circuitry is configured to perform the test operation using the first multi-plate clutch as the one multi-plate clutch, and then perform the test operation using the second multi-plate clutch as the one multi-plate clutch.

3. A vehicle drive device comprising:
    an electric motor;
    a multi-plate clutch including a plurality of clutch plates;
    a pressing mechanism including a piston configured to press the multi-plate clutch;
    an output rotary member to which a drive force of the electric motor is transferred through the multi-plate clutch, and from which the drive force is output to wheels of a vehicle; and
    processing circuitry configured to control the electric motor and the pressing mechanism, wherein:
    the processing circuitry is configured to control the pressing mechanism using information on a result of test operation performed while the vehicle is stationary;
    the test operation includes gradually varying at least one of the drive force of the electric motor and a pressing force of the pressing mechanism to cause a state variation from a slipping state, in which slipping between the clutch plates occurs, to an engaged state, in which slipping between the clutch plates does not occur, or from the engaged state to the slipping state; and
    the processing circuitry is configured to press the clutch plates more strongly as slipping between the clutch plates is more likely to occur based on an index value that indicates a likelihood of occurrence of slipping between the clutch plates and that is obtained as the information on the result of the test operation.

4. A vehicle drive device comprising:
    an electric motor;
    a multi-plate clutch including a plurality of clutch plates;
    a pressing mechanism including a piston configured to press the multi-plate clutch;
    an output rotary member to which a drive force of the electric motor is transferred through the multi-plate clutch, and from which the drive force is output to wheels of a vehicle; and
    processing circuitry configured to control the electric motor and the pressing mechanism, wherein:
    the processing circuitry is configured to control the pressing mechanism using information on a result of test operation performed while the vehicle is stationary;
    the test operation includes gradually varying at least one of the drive force of the electric motor and a pressing force of the pressing mechanism to cause a state variation from a slipping state, in which slipping between the clutch plates occurs, to an engaged state, in which slipping between the clutch plates does not occur, or from the engaged state to the slipping state; and the processing circuitry is configured to perform the test
operation after a start switch for starting the vehicle is
turned off.

\* \* \* \* \*